Dec. 7, 1965     K. D. FAAS ETAL     3,221,378
LENS BLOCKING METHOD AND DEVICE
Filed Jan. 2, 1963     3 Sheets-Sheet 1
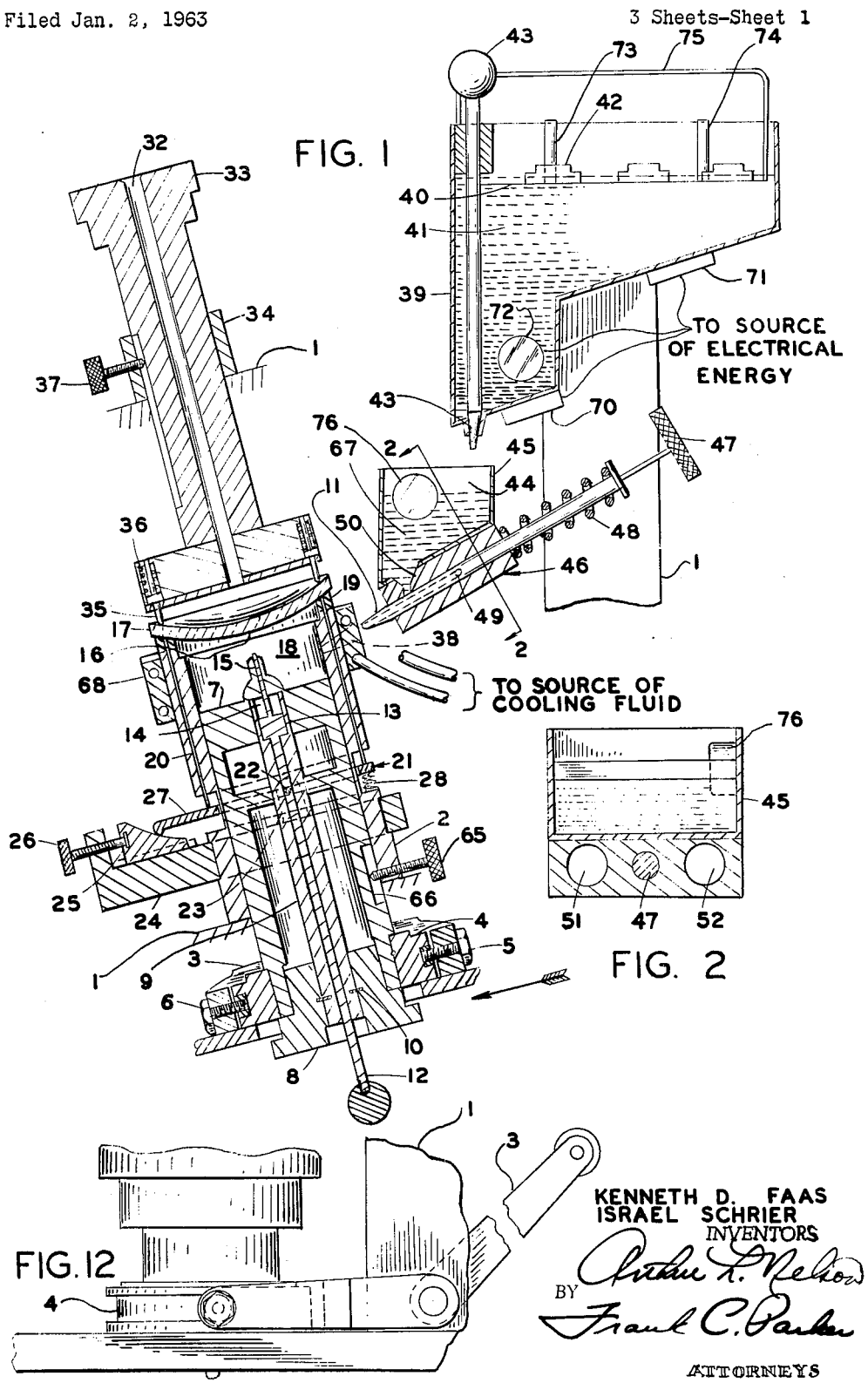
KENNETH D. FAAS
ISRAEL SCHRIER
INVENTORS
BY
ATTORNEYS Dec. 7, 1965     K. D. FAAS ETAL     3,221,378
LENS BLOCKING METHOD AND DEVICE Filed Jan. 2, 1963     3 Sheets-Sheet 3

KENNETH D. FAAS
ISRAEL SCHRIER
INVENTORS

BY

ATTORNEYS

United States Patent Office
3,221,378
Patented Dec. 7, 1965

3,221,378
LENS BLOCKING METHOD AND DEVICE
Kenneth D. Faas, Henrietta, and Israel Schrier, Irondequoit, N.Y., assignors to Bausch & Lomb Incorporated, Rochester, N.Y., a corporation of New York
Filed Jan. 2, 1963, Ser. No. 249,051
7 Claims. (Cl. 22—58)

This invention relates to a lens blocking means and more particularly to a method and a device for blocking an ophthalmic lens.

In the manufacture of ophthalmic lenses a finished surface is generally placed on one of the major surfaces of the lens blank and the prescription is subsequently ground on the second major surface of the lens blank in accordance with the prescription The finished surface is usually placed on the front side of the lens which as a rule is the convex side of an ophthalmic lens. Accordingly the rear surface is concave and is ground in the field.

If astigmatic correction is needed a cross curve is used with a base curve. This type of a lens is generally known as a toric lens because the lens has two principle curves ground on the lens. The term toric is derived from the fact that the surface generated on the lens simulates a surface on a portion of a torus. The two principle powers of the lens are formed in meridians perpendicular to each other. The weaker of the two principle curves on a toric surface is called a rotational curve and the stringer one a cross curve. The rotation curve is also commonly known as a base curve and will be referred to as such subsequently in this description.

Spherical correction, cylindrical correction, and/or, prismatic correction may be provided by surfacing the back surface of the ophthalmic lens. Conventional methods of generating the proper curvature in the field requires calipering of the lens during the process of surfacing. Accordingly this invention is to provide for blocking of an ophthalmic lens which establishes at least one surface on the lens block which is oriented in a predetermined relationship to a point on the finished surface of the lens.

It is an object of this invention to provide a device for blocking an ophthalmic lens.

It is another object of this invention to provide a method for blocking an ophthalmic lens.

It is a further object of this invention to provide a means and method for establishing at least two points on a lens block, a predetermined dimension and orientation to a point on a surface of the lens.

It is a further object of this invention to provide a means and a method of molding a lens block integral with a lens and establishing at least one point on the surface of the lens in a predetermined relationship to at least one surface on the lens block which is adapted for orientation of the lens in a subsequent lens surfacing operation.

It is a further object of this invention to provide means engaging a toric surface on the lens at points intermediate the meridians of minimum and maximum curvature to control the relative position of at least one point on the lens surface relative to at least three points formed on the lens block.

The objects of this invention are accomplished by providing a mold cavity with supporting means for an ophthalmic lens. The supporting means engages the lens at points intermediate the meridians of maximum and minimum curvature on a toric lens and have prismatic adjustment to tilt the lens relative to the mold by the supporting means in accordance with the desired prismatic correction to be ground on the lens. This includes means for positioning the lens block in accordance with the cylindrical axis and means for tilting the lens on an axis which may be angularly spaced from the cylindrical axis to provide prismatic correction. The spherical correction in combination with the astigmatic and prismatic correction will be ground on the lens surface in a subsequent operation once the relationship of at least one surface is molded on the lens block relative to at least one point on the surface of the semi-finished ophthalmic lens.

The molding of the lens block is accomplished by placing a bonding agent on a major surface of the lens. The lens is then placed on the mold and a metal of low melting point in the liquid state is introduced into the mold to form a block which adheres readily to the bonding surface on the lens. The mold forming the lens block automatically molds a surface in a predetermined relationship relative to a point on the finished surface of the ophthalmic lens. This surface orients the lens so that the deired lens surface is automatically ground on the lens during a subsequent surfacing operation.

This invention deals with the formation of the surface on the lens block in a predetermined relationship relative to at least one point on the surface of the lens. The apparatus and method for providing this type of lens blocking is covered in this description.

The preferred embodiment of this invention will be described in the subsequent description and illustrated in the attached drawings.

FIG. 1 is a cross section view of the mold for the lens block and means for supplying the molding material.

FIG. 2 is a cross section view taken on line 2—2 of FIG. 1.

FIG. 12 is a fragmentary view as indicated by the arrow in FIG. 1.

Figure 3:
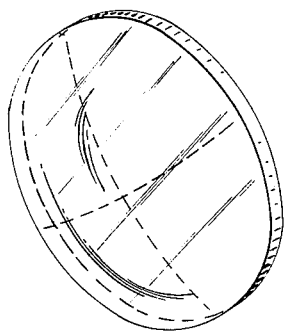
FIG. 3, FIG. 4 and FIG. 5 illustrate the step of applying a bonding agent to one of the major surfaces of the ophthalmic lens blank.

As mentioned previously in this description the molding of the lens block integral with an ophthalmic lens will provide a means for automatically grinding the desired surface on the lens in a single surfacing operation. The initial astigmatic correction may be supplied by the proper selection of the toric surface on the finished major surface of a semi-finished lens blank. The two principle powers on meridians perpendicular to each other form a toric surface. In event no astigmatic correction is needed a spherical finished surface on the semi-finished lens blank is used. In this case the supporting of the lens presents no problem.

It is readily seen, however, where the curvature of the finished surface by which the lens is supported in the mold is a varying curvature between the two meridians that it is critical at what point the lens is supported. If intermediate meridians essentially equally distant from the meridians of major and minor curvature are selected any point on the intermediate meridians on concentric circles about the axis of the lens fall on planes normal to the axis of the lens. This is true only of the intermediate meridians on a toric surface. Accordingly the lens in the mold is supported directly by four pins engaging the lens on the intermediate meridians on a concentric circle concentric with the lens axis. Whether the lens be toric or spherical it is immaterial with this situation as the lens is then tilted in accordance with the tilting device. A direct reading cam arrangement provides the desired lens tilting action through each of four pins.

The axial alignment of the lens and angular rotation of the lens in a toric lens is critical. By controlling the axial distance of a point on the major surface of the lens and the rotation of the lens relative to a surface on the lens block, the position of the curvature generated in a subsequent surfacing operation may be automatically controlled in accordance with the surface formed on the lens block.

Referring to FIG. 1 a mounting structure 1 provides a mounting means for the mold structure and the means for supplying the lens blocking material. The mounting means supports the sleeve 2. A lever 3 is pivotally supported on the mounting means 1 and pivotally connects the collar 4 by means of the two bolts 5 and 6. The sleeve 2 receives the plunger 7 which extends upwardly within the sleeve 2 to mold a surface on a lens block. The end plug 8 is received within an opening in the lower end of the plunger 7 and non-rotatably retains the cylinder 9. The pin 10 fixes the cylinder 9 relative to the plunger 8. The cylinder 9 extends upwardly within the plunger 7 and is received within an annular recess in the upper end of the plunger. The pin 12 forms a piston 13 on its upper end which reciprocates within the chamber 14. The pin 12 forms a stem 15 which moves upwardly to engage the vertex 16 of the lens 17.

The sleeve 2 forms a mold cavity 18 on its upper end. A seal 19 is fitted to the upper end of the sleeve 2 and deforms as it engages the lens 17 as the lens is seated on the plurality of pins 20.

Figure 7:
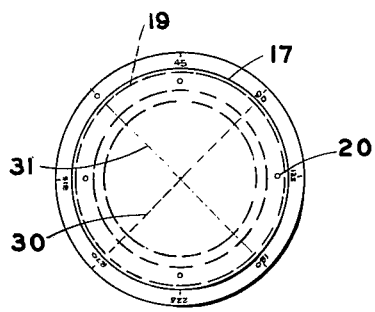
FIG. 7 illustrates positioning the ophthalmic lens on the mold structure in accordance with the cylindrical axis of the lens.

The pins 20 are shown in FIG. 1 as well as FIG. 7. The lower ends of the pins engage the prismatic adjusting ring 21. The ring 21 is pivotally supported on two needle bearings 22 pivotally supported in the ears 23. The ears 23 are formed integral with the bracket 24 which is rotatably mounted on the sleeve 2. The bracket 24 supports a cam 25 for radial movement relative to the bracket. An adjusting screw 26 slides the cam 25 radially moving the arm 27 of ring 21 in accordance with the curvature of the cam.

The ring 21 is biased to an upward position by the spring 28. The spring 28 biases the ring 21 to maintain contact of the arm 27 with the curvature of the cam 25.

Referring to FIG. 7 the lens 17 is positioned on the mold. The meridians of major and minor curvature in a toric lens are shown. The intermediate meridians between major and minor curvature meridians would fall on the pins 20 as illustrated in FIG. 7. The lens 17 engages the seal 19 and is supported by the pins 20 and may be tilted by the engagement of arm 27 of ring 21 on the curved surface of cam 25.

The lens 17 is positioned on the mold in accordance with the base curve meridian of the toric lens. The position of the lens axis is aligned visually.

Figure 8:
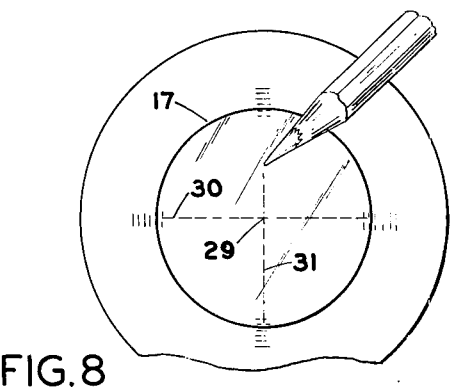
FIG. 8 is a view illustrating the marking of the lens in accordance with the meridians of maximum and minimum power.

Referring to FIG. 8 the lens is marked with its optical center 29 at the cross point of the meridians of major and minor curvature. As viewed in FIG. 8 the meridians of curvature are indicated in the plan of view. The weaker curve will be considered the base curve and indicated by the meridian 31 and the stronger curve will be considered the cross curve indicated by the meridian 30. These are conventional terms, the base curve being the curvature of revolution on a torus while the cross curve being the curvature perpendicular to the curvature of revolution. Either meridian might be chosen as the 0°–180° meridian but for the purpose of illustration the base curve meridian 31 will be considered the 0°–180° meridian of the lens 17 as illustrated in FIG. 7. With a meridian 31 on the lens 17 as the 0°–180° meridian the prismatic correction may then be placed at any angular relationship to this meridian. The bracket 24 is rotated to the angular relationship relative to the base meridian and then the adjustment is made through the adjusting screw 26 on the cam 25.

Figure 4:
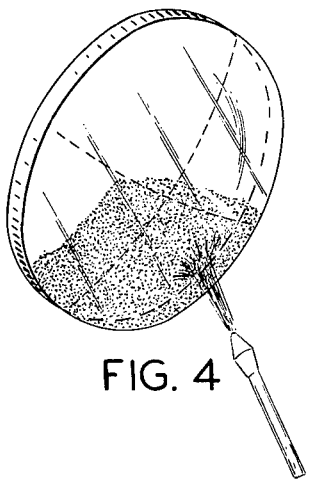
Figure 5:
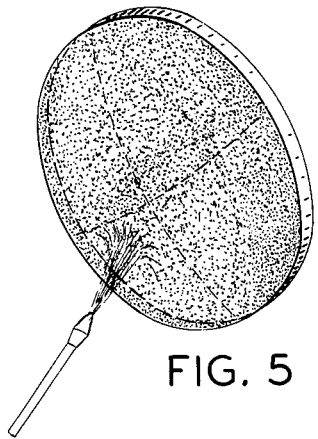

Subsequent to the marking of the lens as illustrated in FIG. 8 a coating of a bonding agent is applied to the lens blank in FIGS. 3, 4 and 5. When the coating has dried, the lens is then positioned on the mold. The optical center 29 being the intersection of the meridians 30 and 31, is visually centered through a central opening 32 in the tube 33. The tube 33 is mounted on a bushing 34. The bushing 34 is mounted on the mounting means 1. With the lens 17 positioned on the mold the tube 33 is moved downwardly until the plurality of fingers 35 engage a point immediately above the mating pins 20 in the mold. The pins 35 are spring biased to a firm contacting position on the lens by each of the plurality of springs 36. Once the lens is seated in position and retained by the pins 35 the lock screw 37 locks the tube 33 in this position.

The mold is provided with a hole 38 to introduce the molten metal into the mold cavity 18. For the purpose of illustration the opening 38 is offset from the cutting plane of the mold of FIG. 1 but aligned with the nozzle 11. The opening might equally well be positioned on a radial line of the mold angularly spaced from any of the pins 20.

The means for supplying the molten metal includes a recovery tank 39 which is heated by elements 70 and 71 and thermally controlled by element 72 to melt the metal from each of the lens blocks 42. A screen 40 is submerged underneath the water 41 in the recovery tank 39 and hung by the arms 73 and 74 and has a handle 75. A plurality of lens blocks 42 are positioned on the screen submerged in water. The temperature of the water is higher than the melting point of the metal, accordingly the metal melts and seeks a lower level in the recovery tank 39. The needle valve 43 may be opened to permit the flow of metal which is in the bottom of the recovery tank 39 to flow into the metal chamber 44 of the metal tank 45. The metal tank 45 is also heated through an automatic heating means of thermal elements 51 and 52 and control element 76 to maintain a constant temperature in the tank. The metal in the chamber 44 is maintained at a temperature slightly above the melting temperature of the metal. A low temperature differential between solidified metal and the metal 44 is maintained to reduce molding time in the mold. The metal valve 46 includes the rod 47 spring biased by a spring 48 to the position as shown in FIG. 1. To introduce metal into the mold cavity 18, the rod 47 is pushed downwardly against the force of the spring 48 and then the rod is rotated 90° to align the opening 49 with the outlet port 50 of chamber 44. This provides communication between the chamber 44 of the tank 45 and the mold cavity 18. The air escapes between the seal 19 and the lens 17. An extremely close fit is not necessary as the metal does not readily wet the seal. As the cavity 18 is filled the rod 47 is rotated 90° and retracted to the position as shown.

FIG. 2 is a cross sectional view taken on line 2—2 of FIG. 1. Due to the expansion of metal upon heating, the parallel heating elements 51 and 52 are mounted parallel to the rod 47. The bottom of tank 45 is inclined so that a minimum depth of fluid is present on one end of the tank to cause liquidation of metal on the shallow portion of the tank. This prevents any damage due to expansion of metal in the heating process.

Figure 6:
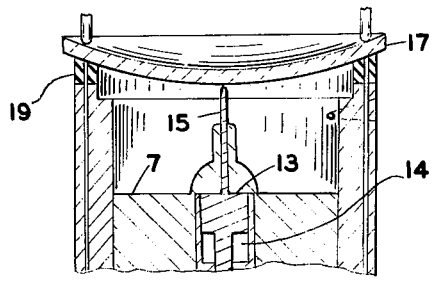
FIG. 6 illustrates the positioning of the ophthalmic lens on the mold and establishing the axial distance between the lens and the molding surface.

Referring to FIG. 6 the lens 17 is positioned on the mold and the stem 15 is moved to its upward position whereby the piston 13 engages the upper wall of the chamber 14. The plunger 7 is in its upper position and locked in this position. The stem and piston is then retracted to the position as illustrated in FIG. 1.

Figure 9:
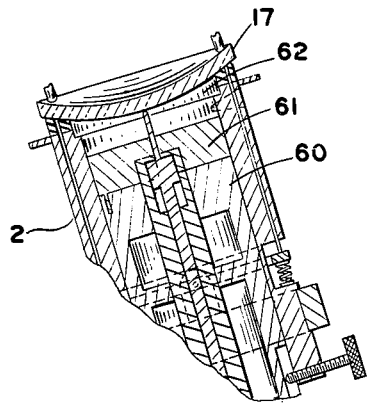
FIG. 9 illustrates a modification with an insert positioned in the mold with a predetermined orientation and distance between the insert and the lens.

The position in FIG. 1 is the molding position for the stem 15. The desired distance between the plunger and the lens has been established at this point. FIG. 9 illustrates a similar means of establishing a predetermined position of the plunger 60 relative to the lens 17 and the insert 61 which is positioned in a lens cavity 62. As the stem 15 engages the vertex of the lens the plunger 60 is locked relative to the lens.

Figures 10, 11:
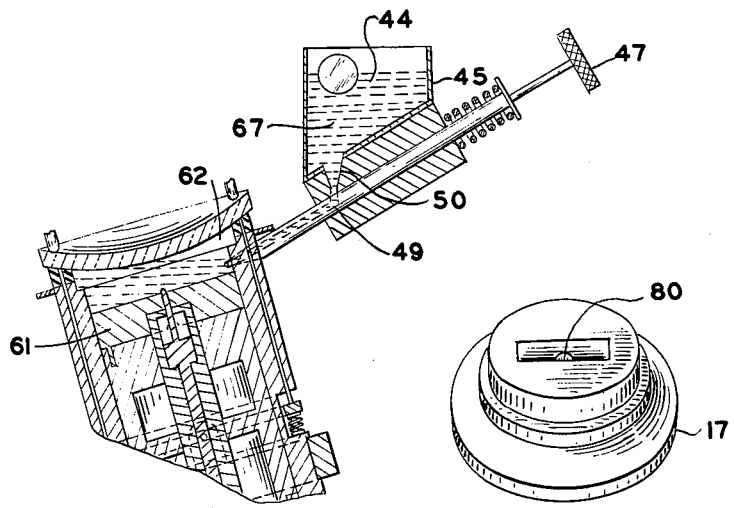
FIG. 10 is a cross section view illustrating the introduction of the molten metal into the mold to form a lens block.
FIG. 11 is a three dimensional view of the lens and lens block.

FIG. 10 illustrates the position of the rod 47 providing communication between the chamber 44 and the mold cavity 62. This position illustrates the valve position for introducing molten metal into the mold cavity. The insert 61 is being molded directly on the lens block. The surface molded on the lens block, or the surface on the insert 61 established the relationship of the lens relative to the lens block surface. It is this relationship which is subsequently used in grinding the desired surface on the lens.

FIG. 11 illustrates the lens block with the tapered recess 80 used for spherical surfacing, as formed in the apparatus illustrated in FIG. 1.

The blocking device as described operates as follows. The lens to be blocked may be positive or negative and glass or plastic. The device provides continuous surface blocking which is necessary for a plastic lens due to the resilience of the lens. An ophthalmic lens 17 is marked as illustrated in FIG. 8 to designate the major and minor powers of curvature in a toric lens. The intersection of these meridians indicate the optical center of the lens. In event that the lens is spherical the optical center may be indicated by a dot.

Subsequent to the step of marking the lens a coating of a bonding agent is placed on the lens. FIG. 3 illustrates a lens with no coating and FIG. 4 illustrates a means for applying the coating on the lens. FIG. 5 illustrates a completed coating on the lens. The bonding agent may be an opaque material of a nitro-cellulose base used to increase the adhesive quality between the lens block and the lens element and also cuts down specular reflection. A lens block might be blocked directly to the lens, however, it is believed the bonding agent provides a superior bonding of the lens block.

The lens is then positioned on the mold. FIG. 7 illustrates the lens 17 positioned on the mold with the cylindrical axis indicated by the line 31. The pins 20 contact the lens at meridians intermediate the meridians at maximum and minimum curvature. The points of contact form a plane parallel with ring 21.

The lens is placed on the four pins which control the tilting of the lens relative to the mold cavity. The pins engage the ring 21 under the opposite ends and are moved axially in response to adjustment of the cam 25 by screw 26. The adjustment of the cam is in accordance with the desired prismatic correction to be ground on the lens.

The lens is visually aligned through opening 33 in tube 32 and moved downwardly to firmly set the pins 35 on the lens 17. The set screw 37 is then tightened to lock the tube 33. The sequence of positioning, visual alignment, and prism correction is not critical but this sequence is preferred.

The pin 12 is moved axially upward until the stem 15 engages the vertex of the lens 17. The pin 12 carries the plunger 7 as it moves upwardly and positions the plunger relative to the lens 17. As the stem 15 engages the vertex of the lens the lock screw 65 is tightened in the key slot 66 and firmly locks the plunger relative to the sleeve 2. This locking function controls the axial thickness of the lens block formed in the mold cavity 18. The adjustment of the adjusting screw 26 controls the tilting of the lens 17 relative to the mold which during a subsequent machining operation controls the prismatic correction to be ground on the lens surface.

With the lens 17 in its proper position and the plunger 7 locked relative to the sleeve 2 the rod 47 is moved downwardly until the nozzle is received within the opening 38. The rod 47 is then rotated 90° until the hole 49 is aligned with the port 50 and communication is established between chamber 44 and the mold cavity 18.

The metal 67 in the chamber 44 flows downwardly into the mold cavity as the air escapes between the seal 19 and the lens 17. As the lens cavity is filled the push rod is rotated 90° and withdrawn from the opening 38.

The cooling coil 68 is connected to a source of cooling fluid and rapidly cools the metal in the cavity 18. The metal in the chamber 67 is but a few degrees above the solidifying temperature and accordingly the metal as it is received in the mold cavity 18 soon hardens.

The tube 33 is then unlocked by the set screw 37 and moved upwardly to release the lens. The plunger 7 is released by unlocking the set screw 65 and moving the plunger slightly upward by lever 3 which releases the lens block from the mold cavity. The lens block is then removed from the plunger. The finished lens block is illustrated in FIG. 11.

The preferred embodiment of this invention is illustrated and described in the above description. Modifications of the preferred embodiment might be devised which would fall within the scope of the invention of which the following claims define.

We claim:

1. An apparatus for making a lens block on a toric lens surface comprising means forming a mold cavity, means slidably mounted in said mold for molding a reference surface a predetermined distance from a point on the toric surface, four pins angularly spaced in said means forming said mold cavity for directly engaging the toric surface of said lens on meridians intermediate the meridians of major and minor curvature of said lens establishing the position of the blocked lens surface relative to the mold, a deformable seal having holes for receiving said pins conforming to the toric surface and sealing said mold cavity, means for tiltably adjusting the axis of the lens blank relative to the axis of said mold by providing relative axial movement of said pins, and means for introducing a molten metal to bond a lens block having a reference surface on said lens.

2. The apparatus for making a lens block for toric and spherical lenses comprising, a mold defining a molding cavity including, a plunger slidably mounted in said mold to vary the volume of the molding cavity and vary the axial position of an established reference surface on the mold block, a pin reciprocating in said plunger and for engaging a point on the major surface of the lens to position said plunger in a predetermined axial distance from said lens for molding said reference surface, prismatic adjusting means engaging the major surface of said lens for tilting said lens, means for introducing a molding material to receive an impression from said mold to establish the reference surface on the lens block while simultaneously molding said block on the major surface of said lens.

3. An apparatus for making a lens block on toric or spherical lenses comprising, a mold defining a mold cavity including, a plunger slidably mounted in said mold to vary the position of a reference surface forming portion in said mold cavity, a gage pin reciprocating in said plunger for engaging the vertex of the lens and positioning said plunger a predetermined distance from the vertex of said lens, a plurality of pins angularly spaced in said mold for engaging points on a common surface of said lens and axially aligning the lens with the mold cavity, prismatic adjusting means engaging and axially moving said pins for tilting said lens to provide prismatic correction in subsequent surfacing operation of said lens, means for introducing a molding material establishing a reference surface on the lens block while simultaneously bonding said block to said lens to provide a predetermined orientation of the reference surface on said lens block relative to the common surface of said lens.

4. An apparatus for blocking a lens having a toric or spherical surface comprising, lens block molding means defining a molding cavity, a plurality of pins in said mold for directly engaging points on the lens surface common to one surface curvature for firmly establishing the position of the lens surface relative to the mold, a flexible seal having holes for said pins engaging the lens surface and sealing the lens cavity, a plunger for molding a reference surface slidably mounted in the cavity defined by said mold, means locating and fixing the position of said plunger a predetermined dimension from a point on the lens surface, means for introducing a molten metal into the molding cavity to form a lens block having said reference surface axially and rotationally positioned in a predetermined relationship to the point on said lens surface.

5. An apparatus for molding a lens block on a toric or spherical surface on a lens comprising, lens block molding means defining a molding cavity, a plurality of pins engaging points on the surface common to at least one of the surface curvatures, a plunger for molding a reference surface on a lens block slidably mounted in the cavity, a pin mounted for reciprocal movement in said plunger for engaging the vertex of the lens surface and positioning the plunger a predetermined axial dimension from the lens surface, locking means for locking the plunger in said predetermined position, means for introducing a molding metal into said mold to form a lens block having said reference surface in a predetermined axial and rotational position to the vertex of the surface supporting the molded lens block.

6. An apparatus for molding a lens block on a toric or spherical surface of a lens, a lens block mold defining a molding cavity, a plurality of pins engaging points on the surface of said lens receiving said lens block at points common to at least one of the surface curvatures, a plunger in said mold for molding a reference surface slidably mounted in said cavity, a pin reciprocally mounted in said plunger for engaging the vertex and measuring a predetermined axial dimension from the plunger relative to said vertex in its forward position and fully retracting out of the lens cavity in its retracted position, locking means for locking the plunger in the predetermined position in said mold, means for introducing a molten metal into the mold to form a lens block forming said reference surface at a predetermined axial and rational position to the vertex of said lens surface.

7. An apparatus for molding a lens block on a toric or spherical surface of the lens comprising a lens block mold defining a mold cavity, a plurality of pins directly engaging points on the surface of the lens common to one surface of curvature, a flexible seal having pin holes for said pins conforming to the surface of the lens and sealing the mold cavity, a plunger slidably mounted in said molding forming one large semi-cylindrical reference surface on the mold block, a measuring pin extending from the portion forming said semi-cylindrical surface for engaging the vertex of the lens and positioning the plunger in a predetermined axial position relative to the vertex of the lens, means for locking the plunger in said predetermined position, means for introducing molten metal into the mold cavity to form a lens block bonded to the surface of the lens with a semi-cylindrical reference surface on the block a predetermined axial and rotational position from the lens surface.

References Cited by the Examiner

UNITED STATES PATENTS

| | | | |
|---|---|---|---|
| 3,049,766 | 8/1962 | Buckminster | 22—58 |
| 3,118,198 | 1/1964 | Prunier | 22—202 |

MARCUS U. LYONS, *Primary Examiner.*